(12) United States Patent
Suzuki

(10) Patent No.: US 7,428,072 B2
(45) Date of Patent: Sep. 23, 2008

(54) PRINTING CONTROL PROGRAM, PRINTING CONTROL METHOD, PRINTING SYSTEM AND INFORMATION PROCESSING APPARATUS

(75) Inventor: Takehiro Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1169 days.

(21) Appl. No.: 10/369,542

(22) Filed: Feb. 21, 2003

(65) Prior Publication Data

US 2003/0161000 A1   Aug. 28, 2003

(30) Foreign Application Priority Data

Feb. 21, 2002 (JP) ............................. 2002/045075
Feb. 21, 2002 (JP) ............................. 2002/045077

(51) Int. Cl.
  *G06F 15/82* (2006.01)
  *G06K 15/02* (2006.01)
  *G06K 1/14* (2006.01)

(52) U.S. Cl. ..................................... 358/1.18; 358/1.15
(58) Field of Classification Search ........................ None
See application file for complete search history.

(56) References Cited

U.S. PATENT DOCUMENTS

| 5,124,731 | A  | * | 6/1992  | Knodt et al.     | 347/129 |
|-----------|----|---|---------|------------------|---------|
| 6,134,568 | A  | * | 10/2000 | Tonkin           | 715/526 |
| 6,842,262 | B1 | * | 1/2005  | Gillihan et al.  | 358/1.15|
| 7,159,190 | B2 | * | 1/2007  | Perry            | 715/825 |
| 7,283,257 | B2 | * | 10/2007 | Bright et al.    | 358/1.1 |
| 2003/0184806 | A1 | * | 10/2003 | Nara et al.   | 358/1.18|
| 2005/0243371 | A1 | * | 11/2005 | Kanaya et al. | 358/1.18|
| 2006/0017976 | A1 | * | 1/2006  | Mori          | 358/1.18|

FOREIGN PATENT DOCUMENTS

| JP | 11-084948       |   | 3/1993  |
|----|-----------------|---|---------|
| JP | 7-199566        |   | 8/1995  |
| JP | 8-76648         |   | 3/1996  |
| JP | 2001-353921     |   | 12/2001 |
| JP | 2002223336 A    | * | 8/2002  |
| JP | 2002316453 A    | * | 10/2002 |

(Continued)

*Primary Examiner*—Twyler L. Haskins
*Assistant Examiner*—Myles D Robinson
(74) *Attorney, Agent, or Firm*—Fitzpatrick, Cella, Harper & Scinto

(57) ABSTRACT

Disclosed is an information processing apparatus for controlling a printing apparatus that is capable of executing insert print processing for inserting a second printing medium as an insert sheet into a first printing medium and printing a plurality of sheets, wherein the information processing apparatus is connected to the printing apparatus and transmits print data in a predetermined format in accordance with an input received via a user interface. If a designation has been made so as to execute the insert print processing for applying print processing to the second printing medium, the second printing medium is assigned a second print setting that differs from a first print setting for the first printing medium, and print data is generated for printing on the second printing medium according to the second print setting and on the first printing medium according to the first print setting. As a result, a print setting that differs from that of other pages is assigned to the insert sheet, thereby making the insert readily distinguishable and providing a chapterization effect with regard to the pages that follow it.

8 Claims, 17 Drawing Sheets

FOREIGN PATENT DOCUMENTS

| | | | | |
|---|---|---|---|---|
| JP | 2002359720 A | * | 12/2002 |
| JP | 2003241915 A | * | 8/2003 |
| JP | 2003241916 A | * | 8/2003 |
| JP | 2003241934 A | * | 8/2003 |
| JP | 2005071162 A | * | 3/2005 |

* cited by examiner

FIG. 5

```
%-12345@PJL CJLMODE
@PJL JOB
@PJL OUTPUT PRINTER1 USER="00" NAME="Inserting Sheet"
@PJL SET SORTING=SORT
@PJL SET NUP-MODE=2
@PJL SET DISPLAY-MESSAGE="Inserting Sheet"
@PJL SET RESOLUTION=FINE
@PJL SET COLOR-MODE=MONOCHROME
@PJL ENTER LANGUAGE=LIPS
```
— 501 JOB INITIALIZING COMMAND GROUP

```
PRINT DATA OF LOGICAL PAGE 1
PRINT DATA OF LOGICAL PAGE 2
PRINT DATA OF LOGICAL PAGE 3
PRINT DATA OF LOGICAL PAGE 4
PRINT DATA OF LOGICAL PAGE 5
PRINT DATA OF LOGICAL PAGE 6
PRINT DATA OF LOGICAL PAGE 7
PRINT DATA OF LOGICAL PAGE 8
PRINT DATA OF LOGICAL PAGE 9
PRINT DATA OF LOGICAL PAGE 10
```
— 502 PRINT DATA GROUP

```
@PJL SET DISPLAYMESSAGE=" "
%12345@PJL EOJ
```
— 503 JOB-END PROCESSING COMMAND GROUP

FIG. 6

| | |
|---|---|
| %-12345@PJL CJLMODE<br>@PJL JOB<br>@PJL OUTPUT PRINTER1 USER="00" NAME="Inserting Sheet"<br>@PJL SET SORTING=SORT<br>@PJL SET NUP-MODE=2<br>@PJL SET DISPLAY-MESSAGE="Inserting Sheet"<br>@PJL SET RESOLUTION=FINE<br>@PJL SET COLOR-MODE=MONOCHROME<br>@PJL ENTER LANGUAGE=LIPS | 601<br>JOB INITIALIZING<br>COMMAND GROUP |
| PRINT DATA OF LOGICAL PAGE 1<br>PRINT DATA OF LOGICAL PAGE 2<br>PRINT DATA OF LOGICAL PAGE 3<br>PRINT DATA OF LOGICAL PAGE 4 | 602<br>PRINT DATA GROUP |
| @PJL SET INSERTING-SHEET=ON<br>@PJL SET INSERTING-SHEET-DRAWER=1 | 603<br>ADDED COMMAND GROUP |
| PRINT DATA OF LOGICAL PAGE 5 | 604 PRINT DATA |
| @PJL SET INSERTING-SHEET=OFF | 605<br>ADDED COMMAND |
| PRINT DATA OF LOGICAL PAGE 6<br>PRINT DATA OF LOGICAL PAGE 7<br>PRINT DATA OF LOGICAL PAGE 8 | 606<br>PRINT DATA GROUP |
| @PJL SET INSERTING-SHEET=ON<br>@PJL SET INSERTING-SHEET-DRAWER=1 | 607<br>ADDED COMMAND GROUP |
| PRINT DATA OF LOGICAL PAGE 9 | 608 PRINT DATA |
| @PJL SET INSERTING-SHEET=OFF | 609<br>ADDED COMMAND |
| PRINT DATA OF LOGICAL PAGE 10 | 610 PRINT DATA |
| @PJL SET DISPLAY-MESSAGE="Inserting Sheet"<br>%12345@PJL EOJ | 611<br>JOB-END<br>PROCESSING<br>COMMAND GROUP |

FIG. 13

| | |
|---|---|
| %-12345@PJL CJLMODE<br>@PJL JOB<br>@PJL OUTPUT PRINTER1 USER="00" NAME="Inserting Sheet"<br>@PJL SET SORTING=SORT<br>@PJL SET NUP-MODE=2<br>@PJL SET PRINT-MODE=BOTHSIDE<br>@PJL SET DISPLAY-MESSAGE="Inserting Sheet"<br>@PJL SET RESOLUTION=FINE<br>@PJL SET COLOR-MODE=MONOCHROME<br>@PJL SET INSERTING-MODE=ON<br>@PJL SET INSERTING-SHEET-DRAWER=1<br>@PJL SET INSERTING-SHEET-PRINT-MODE=BOTHSIDE<br>@PJL ENTER LANGUAGE=LIPS | 601 JOB INITIALIZING COMMAND GROUP<br><br>601a ADDED INITIALIZING COMMAND GROUP |
| PRINT DATA OF LOGICAL PAGE 1<br>PRINT DATA OF LOGICAL PAGE 2<br>PRINT DATA OF LOGICAL PAGE 3<br>PRINT DATA OF LOGICAL PAGE 4 | 602 PRINT DATA GROUP |
| @PJL SET INSERTING-SHEET=ON | 603' ADDED COMMAND |
| PRINT DATA OF LOGICAL PAGE 5 | 604 PRINT DATA |
| @PJL SET INSERTING-SHEET=OFF | 605 ADDED COMMAND |
| PRINT DATA OF LOGICAL PAGE 6<br>PRINT DATA OF LOGICAL PAGE 7<br>PRINT DATA OF LOGICAL PAGE 8 | 606 PRINT DATA GROUP |
| @PJL SET INSERTING-SHEET=ON | 607' ADDED COMMAND |
| PRINT DATA OF LOGICAL PAGE 9 | 608 PRINT DATA |
| @PJL SET INSERTING-SHEET=OFF | 609 ADDED COMMAND |
| PRINT DATA OF LOGICAL PAGE 10 | 610 PRINT DATA |
| @PJL SET DISPLAY-MESSAGE="Inserting Sheet"<br>%12345@PJL EOJ | 611 JOB-END PROCESSING COMMAND GROUP |

PRINTING CONTROL PROGRAM, PRINTING CONTROL METHOD, PRINTING SYSTEM AND INFORMATION PROCESSING APPARATUS

FIELD OF THE INVENTION

This invention relates to a printing control program, printing control method, printing system and information processing apparatus. More particularly, the invention relates to printing control for when a different printing medium is inserted as an insert and printing on a multiple sheets is performed.

BACKGROUND OF THE INVENTION

Printers for printing desired information such as text and images on a sheet-like printing medium such as paper or film are in wide use as information output devices employed in word processors, personal computers and facsimile machines, etc.

With advances that have been made in providing printers with greater functionality in recent years, a large number of so-called multifunction machines have been proposed in recent years. This machines possess not only a printing function but also the functions of a scanner, facsimile and copier. Such multifunction machines have not only copying and printing functions but also functions related to finishing such as sorting, folding and stapling.

Insert processing for inserting insert or chapterization sheets is known as such finishing processing performed by a multifunction machine. Specifically, when a document comprising a plurality of sheets is copied, insert processing affords the document with the effect of topic headings by using paper of, e.g., different colors for pages that are to be distinguished from others, such as pages for table of contents or beginnings of chapters, in such a manner that the sections of the document can be readily identified.

Conventionally, when printing is executed upon specifying insertion of an insert sheet from within an application running on a host computer, the result of printout is either of the following:

(1) The insert sheet is inserted at the specified page but the machine cannot be set for printing on the insert sheet. This means that nothing can be printed on the insert.
(2) Since printing different from that of other pages cannot be set for the insert, printing is performed on the insert sheet using settings the same as those for the other pages. In this case, if double-sided printing has been specified for other pages, then the insert sheet also will undergo double-sided printing. If multiple (N) images have been specified to be assigned to other pages (in an N-UP layout or N-in-1 layout), then the insert sheet also will be printed in the N-up layout.

However, since the reason why the user executes insert processing is to make it easier to recognize pages such as table of contents and the beginnings of chapters that are to be distinguished from other pages, as mentioned above, there are many cases where the user wishes to make a setting at least for the front side of the insert sheet that is different from that of the other pages, e.g., a setting to print the front side in a 1UP layout, in which only one image is printed on the front side.

However, with insert processing performed by a conventional printer, such printing cannot be performed and, hence, user needs cannot be satisfied.

More specifically, in the case of point (1) above, printing cannot be performed on the insert. Therefore, though the insert sheet can be identified as a page, information relating to the content of the pages that follow the insert sheet is not obtained from the insert sheet. In the case of point (2) above, printing is performed on the insert using a print setting similar to that for the other pages and therefor a satisfactory "topic heading" effect is not obtained from the insert. For example, if the insert sheet also undergoes double-sided printing or if images are printed on the insert sheet in a layout identical with that of the other pages, images that represent the content of the pages that follow the insert sheet will not stand out.

In order for printing performed on an insert sheet to be set differently from that of other pages, therefore, the conventional practice is first to perform printing on the insert sheet and other pages separately using print settings for the insert sheet that differ from the print settings for the other pages, and then to have the user gather the printed sheets together and insert the insert sheets manually. This entails user labor and is inefficient.

SUMMARY OF THE INVENTION

Accordingly, a first object of the present invention is to make it possible to print on an insert sheet using a print setting different from that of other pages when a different printing medium is inserted as an insert sheet and printing on a multiple sheets of paper is performed.

A second object of the present invention is to make it possible to select a printing side for an insert sheet and to enable printing in a layout suited to the selection of the printing side when a different printing medium is inserted as an insert sheet and printing on a multiple sheets of paper is performed.

According to the present invention, the first object is attained by providing a printing control program in a first mode of the present invention, the printing control program being executed by an information processing apparatus for controlling a printing apparatus that is capable of executing insert print processing for inserting a second printing medium as an insert sheet into a first printing medium and printing a plurality of sheets, wherein the information processing apparatus is connected to the printing apparatus and transmits print data in a predetermined format in accordance with an input received via a user interface, wherein the program causes the information processing apparatus to execute: a print-setting assignment step of assigning the second printing medium a second print setting that differs from a first print setting for the first printing medium in a case where a designation has been made so as to execute the insert print processing for applying print processing to the second printing medium; and a print-data generating step of generating print data in which the second printing medium is printed on according to the second print setting assigned by the print-setting assignment step and the first printing medium is printed on according to the first print setting.

The first object is attained also by a printing control method, printing system and information processing apparatus corresponding to the above-described printing control program.

Specifically, according to the first mode of the present invention, there is provided an information processing apparatus for controlling a printing apparatus that is capable of executing insert print processing for inserting a second printing medium as an insert sheet into a first printing medium and printing a plurality of sheets, wherein the information processing apparatus is connected to the printing apparatus and transmits print data in a predetermined format in accordance with an input received via a user interface, the information processing apparatus assigning the second printing medium a second print setting that differs from a first print setting of the first printing medium in a case where a designation has been made so as to execute insert print processing for applying print processing to the second printing medium, and generating print data in which the second printing medium is printed on according to the second print setting and the first printing medium is printed on according to the first print setting.

If this arrangement is adopted, a print setting that differs from that of other pages is assigned to the insert sheet, thereby making the insert sheet readily distinguishable and providing the effect of a topic heading with regard to the pages that follow it.

Through a single print process, therefore, it is possible to obtain an output printed according to settings desired by the user with regard to both the insert sheet and other pages.

It is preferable to adopt an arrangement in which whether print processing is applied to the second printing medium can be set when a designation is made so as to execute insert print processing.

Further, the print data may be generated in a format in which information concerning print settings regarding the first and second printing media is added to each page as necessary. The data of the first printing medium may be generated upon arranging each page according to a printing layout of the first print setting, and the data of the second printing medium may be generated upon arranging each page according to a printing layout of the second print setting.

A layout in which the data of one page is laid out for a single sheet of a printing medium is preferred as the printing layout of the second print setting.

Ideally, whether print processing of the second printing medium is applied to the front side thereof, the back side thereof or both sides thereof can be set.

If it is so arranged that settable parameters are displayed via a user interface in regard to each of a number of items to be set, whereby parameters are set by having the user select them, then errors in the setting operation by the user can be prevented and setting is facilitated.

According to the present invention, the second object is attained by providing a printing control program in a second mode of the present invention, the printing control program being executed by an information processing apparatus for controlling a printing apparatus that is capable of executing insert print processing for inserting a second printing medium as an insert sheet into a first printing medium and printing a plurality of sheets, wherein the information processing apparatus is connected to the printing apparatus and transmits print data in a predetermined format in accordance with an input received via a user interface, wherein the program causes the information processing apparatus to execute: a print-setting assignment step of assigning the second printing medium a second print setting that differs from a first print setting of the first printing medium in a case where a designation has been made so as to execute insert print processing for applying print processing to the second printing medium; and a print-data generating step of generating print data in which the second printing medium is printed on according to the second print setting assigned by the print-setting assignment step and the first printing medium is printed on according to the first print setting; wherein if print processing is applied to both sides of the second printing medium, the print-data generating step generates data in which printing is performed on the front side of the second printing medium according to a printing layout of the second print setting and on the back side of the second printing medium according to a printing layout the same as that of the first print setting.

The second object is attained also by a printing control method, printing system and information processing apparatus corresponding to the above-described printing control program.

Specifically, according to the second mode of the present invention, there is provided an information processing apparatus for controlling a printing apparatus that is capable of executing insert print processing for inserting a second printing medium as an insert sheet into a first printing medium and printing a plurality of sheets, wherein the information processing apparatus is connected to the printing apparatus and transmits print data in a predetermined format in accordance with an input received via a user interface, the information processing apparatus assigning the second printing medium a second print setting that differs from a first print setting of the first printing medium in a case where a designation has been made so as to execute insert print processing for applying print processing to the second printing medium, and generating print data in which the second printing medium is printed on according to the second print setting and the first printing medium is printed on according to the first print setting; wherein if print processing is applied to both sides of the second printing medium, the information processing apparatus generates data in which printing is performed on the front side of the second printing medium according to a printing layout of the second print setting and on the back side of the second printing medium according to a printing layout the same as that of the first print setting.

This arrangement is such that when only the front side or back side of an insert sheet is printed on, printing is performed in, e.g., the 1UP layout so that the insert portion is rendered readily recognizable and the effect of a topic heading is provided with regard to pages that follow the insert. When both sides of the insert are printed on, the front side is printed in, e.g., the 1UP layout to provide the effect of a topic heading and the back side is printed according to a layout setting identical with that of other pages, thereby making it possible to reduce the total number of pages printed.

Accordingly, through a single print process, it is possible to obtain an output printed in an appropriate layout and conforming to the settings for the printed sides of the insert sheet.

It is preferable to adopt an arrangement in which whether print processing is applied to the second printing medium can be set when a designation is made so as to execute insert print processing.

Further, the print data may be generated in a format in which information concerning print settings regarding the first and second printing media is added to each page as necessary. The data of the first printing medium may be generated upon arranging each page according to a printing layout of first print setting, and the data of the second printing medium may be generated upon arranging each page according to a printing layout of the second print setting.

A layout in which the data of one page is laid out on a single sheet of a printing medium is preferred as the printing layout of the second print setting.

Ideally, whether print processing of the second printing medium is applied to the front side thereof, the back side thereof or on both sides thereof can be set.

If it is so arranged that selectable parameters are displayed via a user interface in regard to each of a number of items to be set, whereby parameters are set by having the user select them, then errors in the setting operation by the user can be prevented and setting is facilitated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 5 is a diagram illustrating an example of the content of print data generated when an insert sheet is not inserted;

FIG. 6 is a diagram illustrating an example of the content of print data generated when insertion of an insert sheet has been set;

DESCRIPTION OF THE PREFERRED EMBODIMENTS

Preferred embodiments of the present invention will now be described in detail in accordance with the accompanying drawings.

<First Embodiment>

Figure 1:
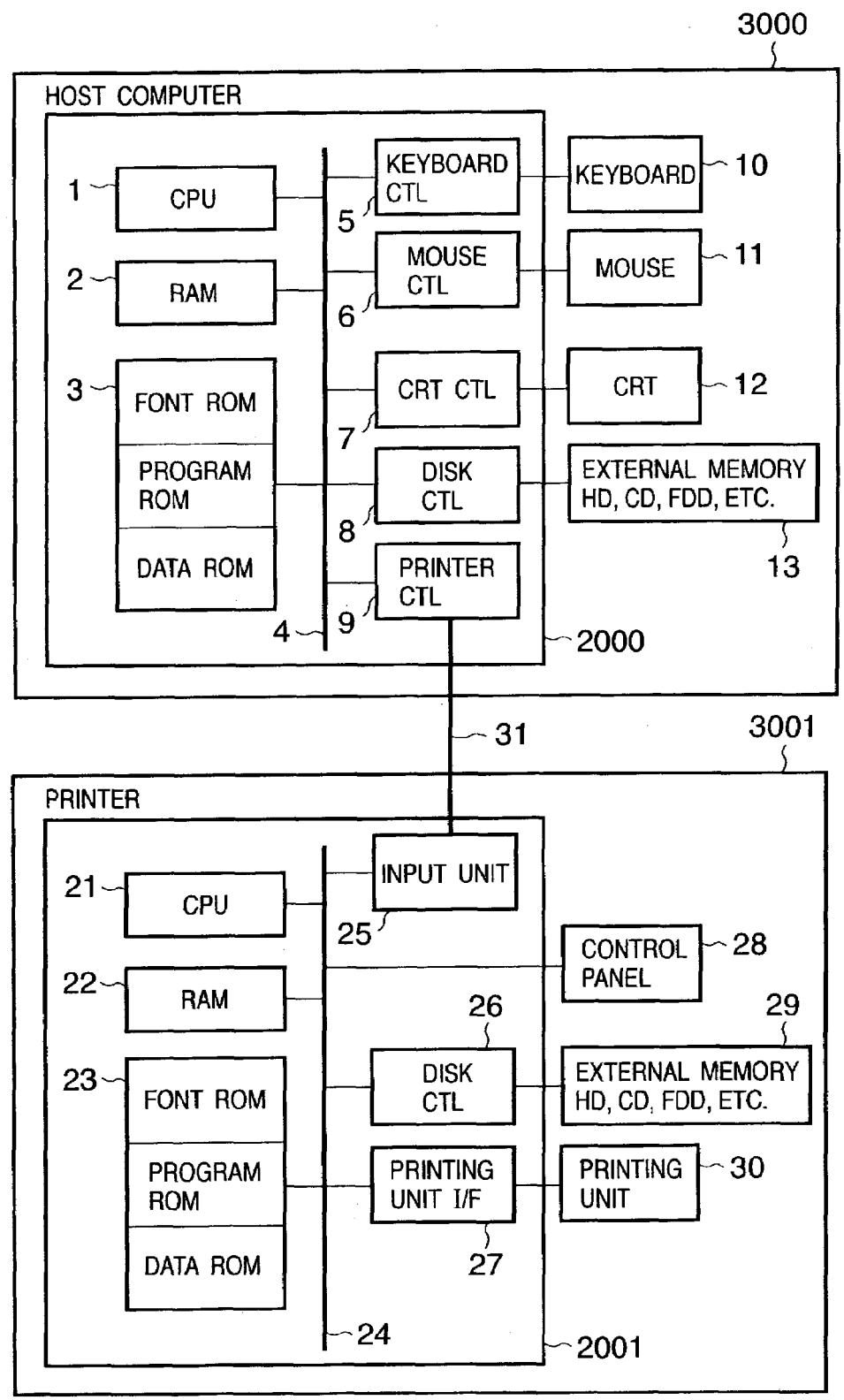
FIG. 1 is a block diagram illustrating the configuration of a printing system according to a first embodiment of the present invention.

FIG. 1 is a block diagram illustrating the configuration of a printing system according to a first embodiment of the present invention. In the embodiment that follows, a printing system comprising a computer acting as a host device and a printer serving as a printing apparatus will be described as an example. Unless stated otherwise, so long as the implementation is one in which the functions of the present invention can be executed, it goes without saying that the present invention can be applied to a single device, a system comprising a plurality of devices, or a system in which the processing is executed upon connecting devices together via a network such as a LAN or WAN.

As shown in FIG. 1, the system includes a host computer 3000, which is one example ideal as the information processing apparatus of the present invention. The host computer 3000 has a CPU 1 which, on the basis of a word processing program that has been stored in a program ROM of a ROM 3 or in an external memory 13, executes the word processing of a document containing mixed objects such as graphics, images, text and tables (inclusive of spreadsheets, etc.). The CPU 1 performs overall control of various devices connected to a system bus 4.

The program ROM of the ROM 3 or the external memory 13 stores an operating system (OS) program, which is the control program of the CPU 1, a font ROM of the ROM 3 or the external memory 13 stores font data, etc., used when the above-mentioned word processing is executed, and a data ROM of the ROM 3 or the external memory 13 stores an installed printer driver, which is an ideal example of the printing control program of the present invention, as well as various data used when the above-mentioned word processing is executed.

A RAM 2 functions as the main memory and work area of the CPU 1. A keyboard controller (keyboard CTL) 5 controls key inputs from a keyboard 10 and a mouse controller (mouse CTL) 6 controls inputs from a mouse 11 serving as a pointing device. A CRT controller (CRT CTL) 7 controls the display on a CRT display (CRT) 12 (display screen). A disk controller (DISK CTL) 8 controls access to the external memory 13, such as a hard disk (HD), compact disk (CD) or floppy disk (FD), which stores a booting program, various applications, font data, user files, edited files and a program (printer driver) for generating printer control commands.

A printer controller (PRINTER CTL) 9, which is connected to a printer 3001 via a prescribed bidirectional interface 31, executes processing for controlling communication with the printer 3001.

The structure of the computer 3000 is illustrated in simplified form. The interface with the printer may be a parallel interface (IEEE 1284, which is a parallel interface compliant with the Centronics standard in the USA), a USB (Universal Serial Bus) interface or an IEEE 1394, and a connection via a network such as a LAN or WAN is conceivable. However, the present invention is not limited to these and the connection can take on a variety of forms. Other connections via interfaces developed at the time of the invention are possible.

It should be noted that the CPU 1 executes processing for rasterizing outline fonts in a display-information RAM set up in the RAM 2, for example, and exercises control and management of various windows registered based upon commands designated by a cursor or the like.

The components 1 to 9 are mounted on a mother board 2000 of the host computer 3000, and the components 10 to 13 are connected to corresponding connectors of the mother board 2000 as by cables or the like.

The program of the printer driver that controls the printer 3001 has been stored in the program ROM of the ROM 3 or in the external memory 13. By starting up the printer driver, the user can perform various settings for the printer and can make print settings that include selection of printing mode and finishing processing.

The printer 3001 has a printer CPU 21. On the basis of a control program, etc., stored in a program ROM of a ROM 23 or a control program stored in an external memory 29, the printer CPU 21 outputs an image signal, which serves as output information, via printing unit interface 27 to a printing unit (printer engine) 30 connected to a system bus 24. A control program of the CPU 21 is stored in a program ROM of the ROM 23.

Font data, etc., used when the above-mentioned output information is generated is stored in a font ROM of the ROM 23. In case of a printer not equipped with the external memory 29 such as a hard disk, information or the like utilized in the host computer is stored in a data ROM of the ROM 23.

The CPU 21, which is capable of bi-directional communication with the host computer 3000 via an input unit 25, is capable of receiving data to be printed, as mentioned above, and of transmitting information inside the printer to the host computer 3000.

A RAM 22, which functions as the main memory and work area, etc., of the CPU 21, is so adapted that memory capacity can be expanded by optional RAM connected to expansion socket, not shown. The RAM 22 is used as an area for rasterizing output information, as an area for storing rasterized data and as an area for storing setting data.

The external memory 29, such a hard disk (HD) or IC card, has its access controlled by a disk controller (DISK CTL) 26. The external memory 29, which is connected to the printer as an option, stores font data, an emulation program and form data, etc.

Further, a control panel 28 has a touch-sensitive panel and switches for operation by the user, and indicators such as LEDs. The above-mentioned external memory is not limited to a single memory. A plurality of these memories can be provided and an arrangement may be adopted in which a plurality of optional cards storing optional fonts to supplement the internal fonts or a plurality of external memories storing programs for interpreting printer control languages of different language systems can be connected to the apparatus. Furthermore, the external memory may have an NVRAM (not shown) for storing printer mode setting information entered from the control panel 28 or transmitted from the host computer.

The components 21 to 27 are mounted on a mother board 2001, and the components 28 to 30 are connected as by various cables or the like.

It should be noted that the printer 3001 is equipped with a plurality of paper feed trays serving as paper feeding means, and with a sheet feeder for manually inserted paper. For example, paper of a plurality of types can be supplied by respective ones of different supply paths. This makes it possible to perform insert printing using paper of different types.

Figure 2:
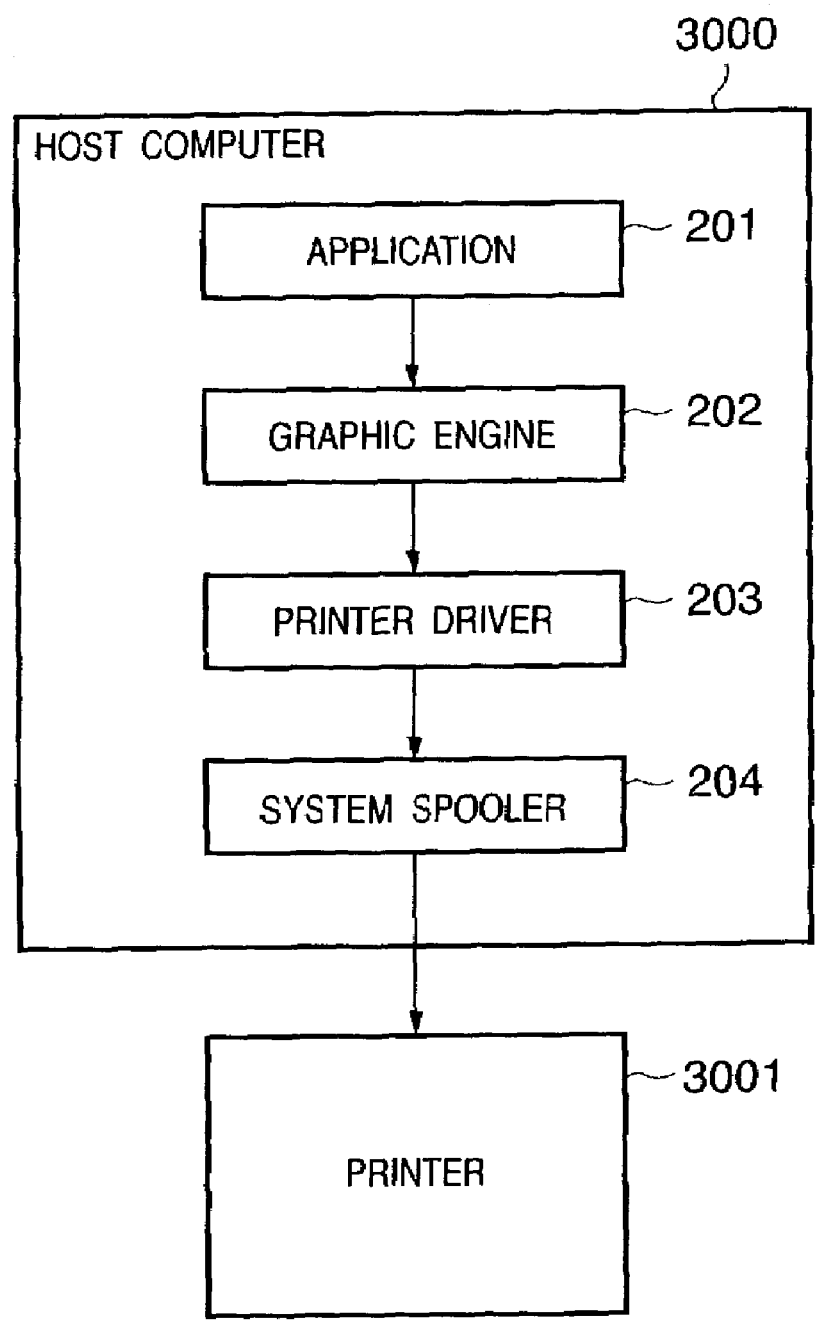
FIG. 2 is a block diagram illustrating a procedure for generating print data in a host computer.

FIG. 2 is a diagram illustrating the flow of processing when printing is executed in the printing system of FIG. 1. An application 201, graphic engine 202, printer driver 203 and system spooler 204 are retained in the external memory 13 as files. These are program modules which, when they are to be executed, are loaded in the RAM 2 and executed by the operating system and by modules which utilize this module. This embodiment will be described taking Microsoft's Windows operating system as an example.

The application 201 and the printer driver 203 can be added to and rewritten on a storage medium such as a floppy disk or CD-ROM or can be added to and rewritten in a storage area, such as a hard disk of the external memory 13, via a network, not shown.

As mentioned above, the application 201 stored in the external memory 13 is executed upon being loaded in the RAM 2. When printing is performed by the printer 3001 during execution of the application 201, output (rendering) of data is performed utilizing the graphic engine 202 capable of being executed upon being similarly loaded in the RAM 2. More specifically, the application 201 provides a graphic output utilizing a common rendering function [referred to as a GDI (Graphic Device Interface) function] defined by the operating system.

The graphic engine 202 similarly loads the printer driver 203, which supports the connected printer 3001, from the external memory 13 to the RAM 2, converts the GDI function, which is data that is output from within the application 201, to a rendering function [referred to as a DDI (Device Driver Interface) function] that is capable of being interpreted by the printer driver 203, and outputs the DDI function to the printer driver 203. The printer driver 203 converts the DDI function, which has been delivered from the graphic engine 202, to a printer control command capable of being interpreted by the printer 3001.

The printer control command obtained by the conversion is output to the printer 3001 via a system spooler 204, which has been loaded in the RAM 2 by the operating system, through an interface 31. As a result, printing is performed by the printer 3001.

Figure 3:
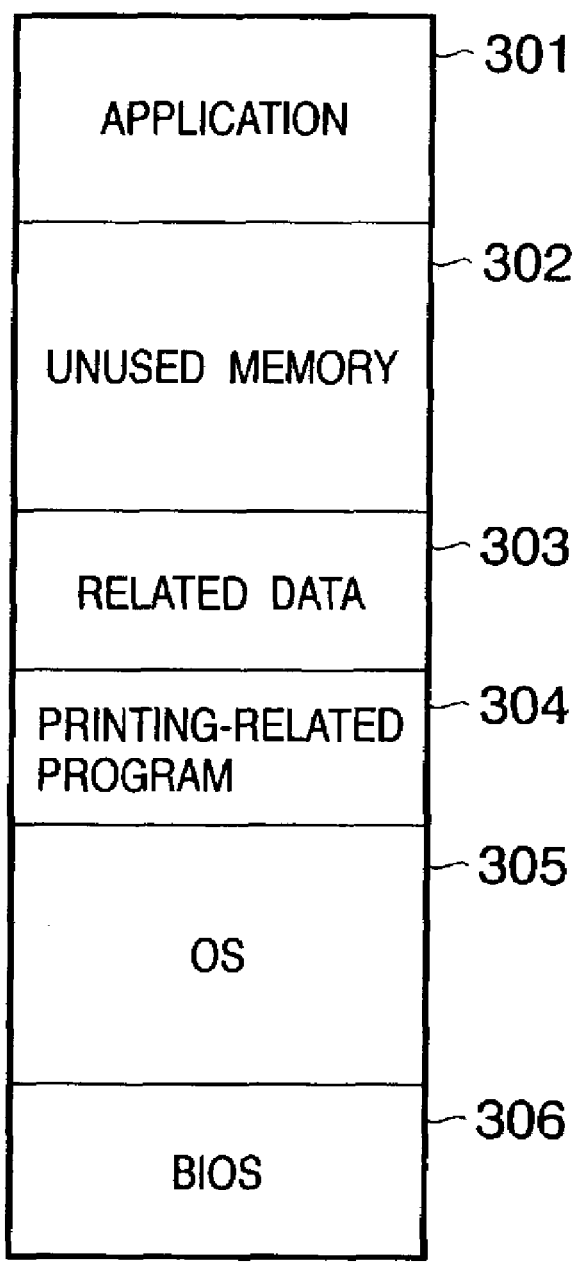
FIG. 3 is a diagram illustrating a memory map in a RAM of a host computer in a state in which print processing can be executed according to the first embodiment.

FIG. 3 illustrates an example of a memory map in the RAM 2 of the host computer 3000 in a state in which printing can be executed from within an application in this embodiment.

As shown in FIG. 3, an application 301 is loaded from the leading address and a BIOS 306, OS 305, printing-related program 304 and related data 303 are loaded from the final address leaving a portion of unused memory 302. What is indicated as the printing-related program 304 is the portion indicated as the graphic engine 202, printer driver 203, which is the printing control program of the present invention, and the system spooler 204 shown in FIG. 2.

According to this embodiment, the printer driver is so adapted that a print setting regarding an insert sheet can be made separately from a print setting regarding other pages. When the user specifies printing from within an application, the printer driver starts up and a screen (not shown) indicating the present settings of the printer driver is displayed on the CRT of the host computer. Accordingly, the printer driver has display information for causing a print setting screen (described later) to be displayed on the CRT screen. Specifically, the display information corresponds to instruction information, such as the size of a dialog screen, the positions of radio buttons on a print screen, the positions of pull-down menus and selections, as instructions for causing the operating system to display a dialog screen, and a plurality of preview images of patterns decided in order to visibly display the state of print settings for the user.

Figure 10:
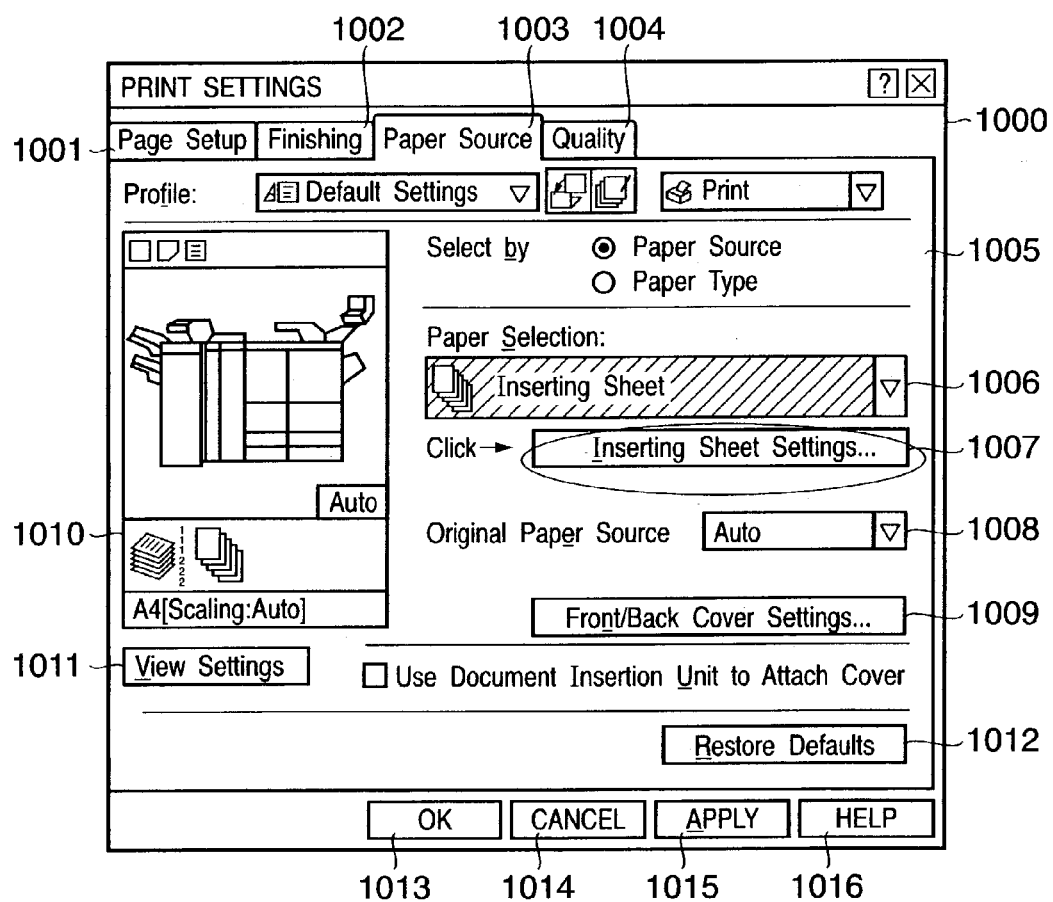
FIG. 10 illustrates an example of the print setting screen of a printer driver according to the first embodiment.

If a corresponding button is clicked for the purpose of making a print setting on the print setting screen displayed in response to an instruction from the printer driver, a print setting screen 1000 exemplified in FIG. 10 is displayed. The print settings include a page setting (Page Setup), a finishing processing setting (Finishing), a paper feed setting (Paper Source) and a print quality setting (Quality), and corresponding heading buttons 1001 to 1004, respectively, are provided. It should be noted that FIG. 10 illustrates a display that corresponds to the setting of paper feed (paper source).

When this screen is being displayed, selection of the method of specifying paper feed at 1005, selection of whether or not to use an insert sheet at 1006, selection of the paper feed tray at 1008 and setting of a cover page at 1009 can be achieved by having the user make the selection using a pointing device such as a mouse. An image rendering area 1010 displays the present state of the printer configuration and the state of the page settings in the form of images.

A View Settings button 1011 is a button for displaying information that has been set; a default setting button 1012 is a button for restoring the settings relating to the paper source to default settings that were set at the time of shipping; an OK button 1013 validates settings and terminates processing; a cancel button 1014 invalidates settings and terminates processing; a button 1015 is clicked in a case where the present settings are to be validated and further settings are to be made; and a help button 1016 is for displaying detailed information relating to setting methods.

Figure 4:
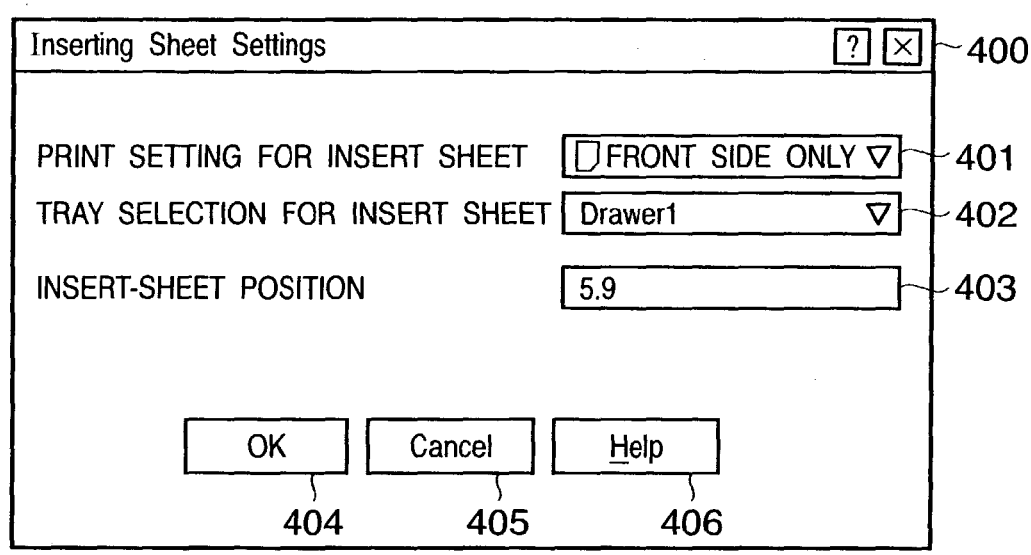
FIG. 4 is a diagram illustrating an example of a setting screen regarding an insert sheet according to the first embodiment.

If a setting is made at 1006 so as to perform insertion of a sheet, an insert-sheet setting button at 1007 is activated. Clicking on this button causes the display of an insert-sheet setting screen 400, one example of which is illustrated in FIG. 4.

An area 401 is for selecting printing on an insert. For example, front-sided printing, back-sided printing, double-sided printing or no printing can be selected using a pull-down menu. An area 402 is for selecting the tray for the insert sheet. For example, by using a pull-down menu, it is possible to select from presently loaded trays and from a sheet feeder (Drawer) for paper feed by manual insertion. An area 403 is for designating the position at which the insert is to be made. For example, pages at which insert sheets are to be inserted are demarcated and specified by commas. According to the settings illustrated in FIG. 4, printing is to be performed only on the front side of the inserts, the insert paper is to be supplied from the manual-insertion sheet feeder "Drawer 1", and the inserts are to be inserted as fifth and ninth pages.

An OK button 404 validates the settings and terminates processing; a cancel button 405 invalidates the settings and terminates processing; and a help button 406 is for displaying detailed information relating to setting methods.

Here the display is for a case where setting based upon the feed tray has been selected in the area 1005 for selecting the method of specifying paper feed in FIG. 10. In a case where setting based upon the paper type has been selected, the paper type for the insert would be selected in area 402.

Next, print data generated in this embodiment will be described for a case where an insert sheet is not inserted and for a case where an insert sheet is inserted.

FIG. 5 is a diagram illustrating an example of the content of print data generated during ordinary operation, namely when an insert sheet is not inserted. The data shown in FIG. 5 is written in page description language. The data includes a job initializing command group 501, a print data group 502 and a job-end processing command group 503. Here the setting is such that the data of a logical page 10 will be printed in the single-sided 2UP layout. The print data group 502 is such that the print data is arranged page by page in order.

FIG. 6 is a diagram illustrating an example of the content of print data generated when insertion of an insert sheet has been set. The data shown in FIG. 6 is written in page description language. Here also, in a manner similar to that of FIG. 5, the setup is such that the data of logical page 10 will be printed in 2UP. In addition, however, fifth and ninth pages have been specified as the page numbers of insert sheets to be inserted, and printing on the insert sheets has been set for the front side only.

In conformity with such insertion of insert sheets, command groups for turning insert-sheet insertion processing ON and OFF have been added before and after (at 603 and 605, 607 and 609) print data 604 of the fifth page and print data 608 of the ninth page. The result of printout of the print data of FIG. 6 is as illustrated in FIG. 7D.

FIGS. 7A to 7G are diagrams illustrating print data, which is generated by the host computer according to this embodiment, and examples of results printout by a printer. Though the print data transmitted from the host computer is all the same, the print settings regarding each of the pages and the print settings regarding the inserts differ from each other.

Figure 7A:
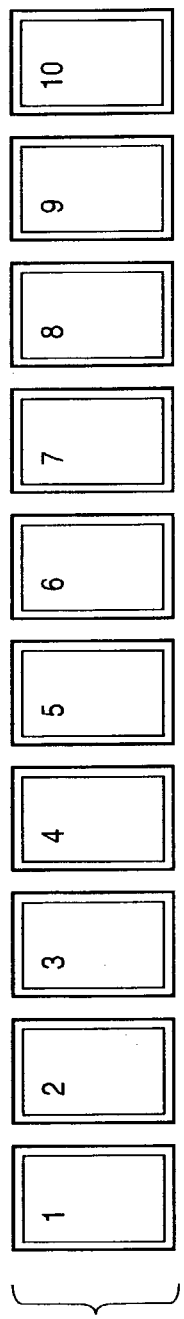
FIGS. 7A to 7G are diagrams illustrating print data from a host computer and examples of results output by a printer with regard to various settings for insert sheets.
Figure 7B:
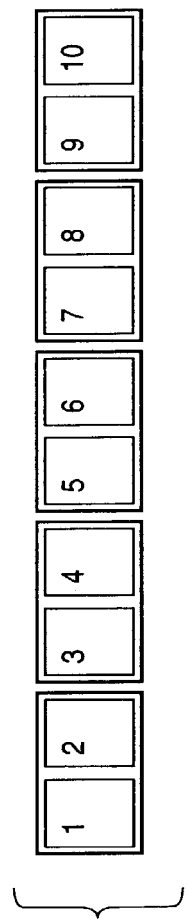
Figure 7C:
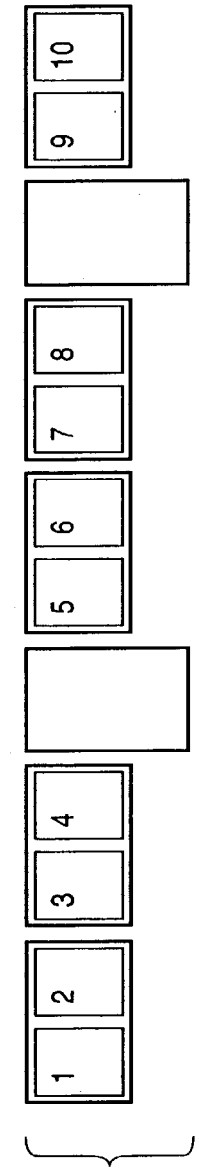
Figure 7D:
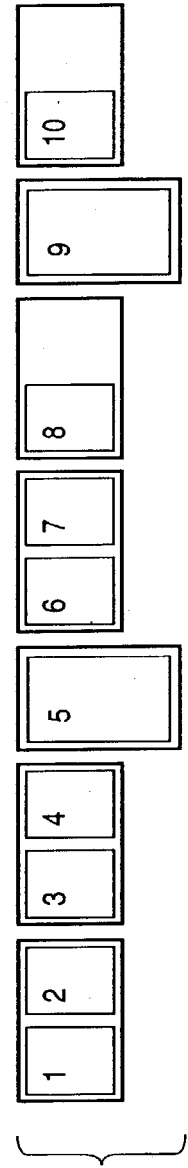

FIG. 7A illustrates print data that has been transmitted from the host computer; FIG. 7B illustrates result of printing in a case where there are no inserts and single-sided 2UP has been set for each page; FIG. 7C illustrates result of printing in a case where insert sheets are inserted, printing has not been set for the insert sheets and single-sided 2UP has been set for each page; and FIG. 7D illustrates result of printing in a case where insert sheets are inserted, only front-sided printing has been set for the inserts and single-sided 2UP has been set for the other pages. FIGS. 7A to 7D correspond to the print data illustrated in FIG. 6 described above.

Figure 7E:
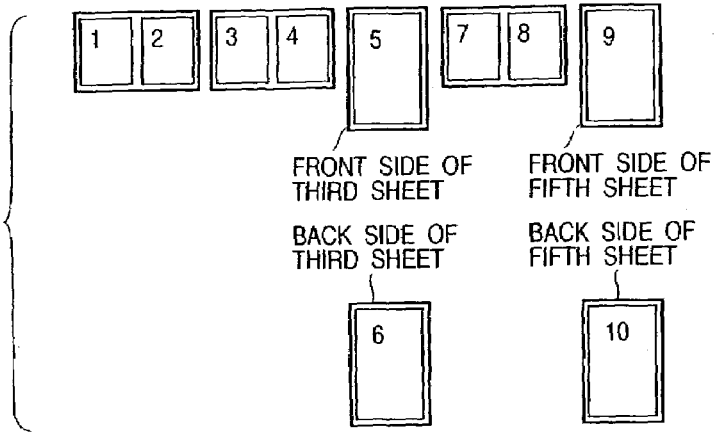
Figure 7F:
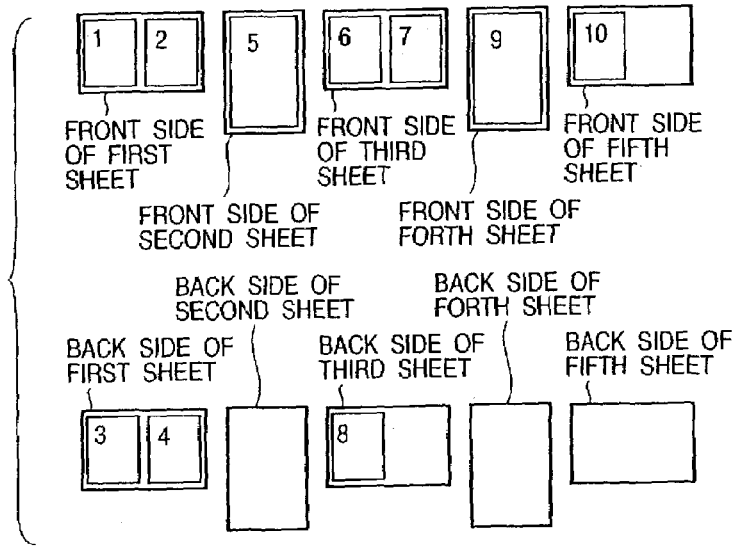
Figure 7G:
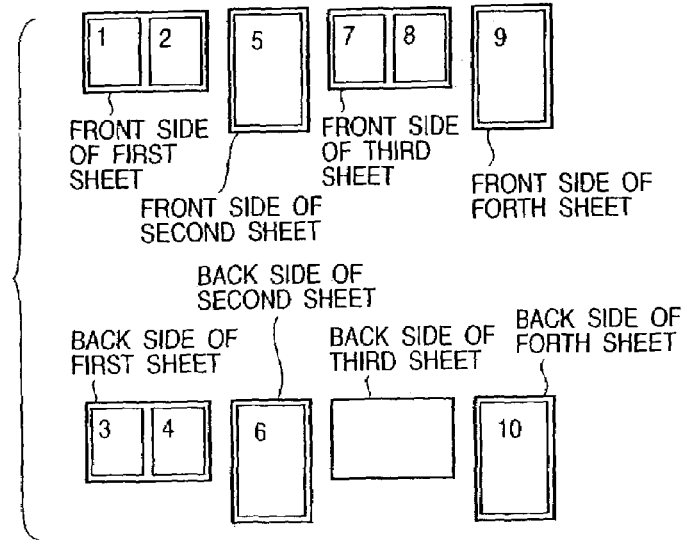

The examples illustrated in FIGS. 7E to 7G all illustrate that insert sheets have been inserted. FIG. 7E illustrates result of printing in a case where double-sided printing has been set for the insert sheets and single-sided 2-UP has been set for the other pages; FIG. 7F illustrates result of printing in a case where only front-sided printing has been set for the inserts and doubled-sided 2UP has been sent for the other pages; and FIG. 7G illustrates result of printing in a case where double-sided printing has been set for the inserts and double-sided 2UP has been set for the other pages.

Figure 8:
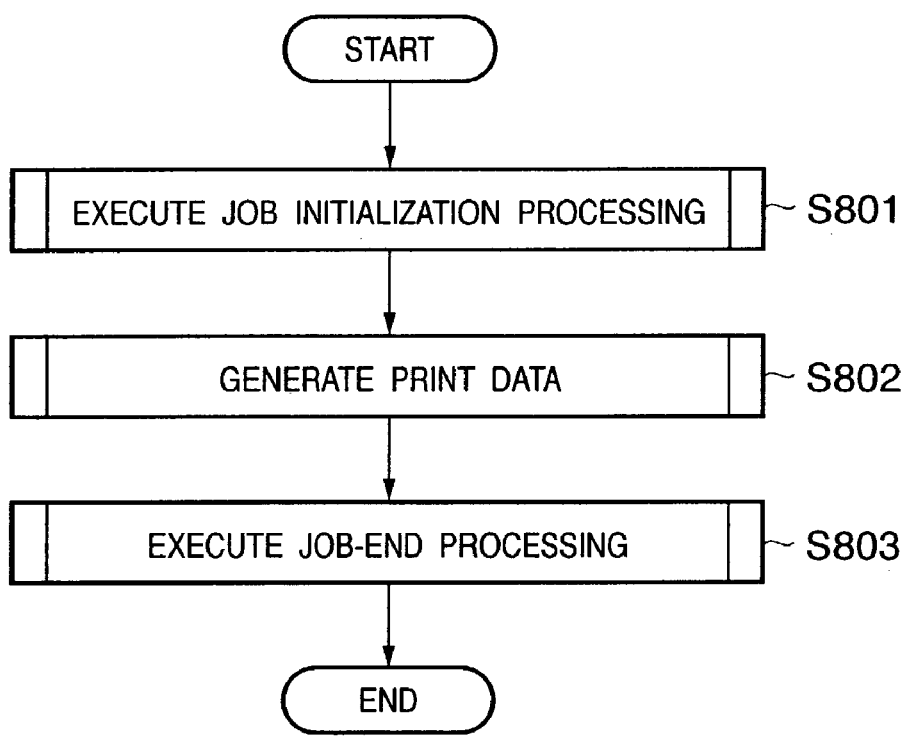
FIG. 8 is a flowchart illustrating print processing executed by the host computer according to the first embodiment.
Figure 9:
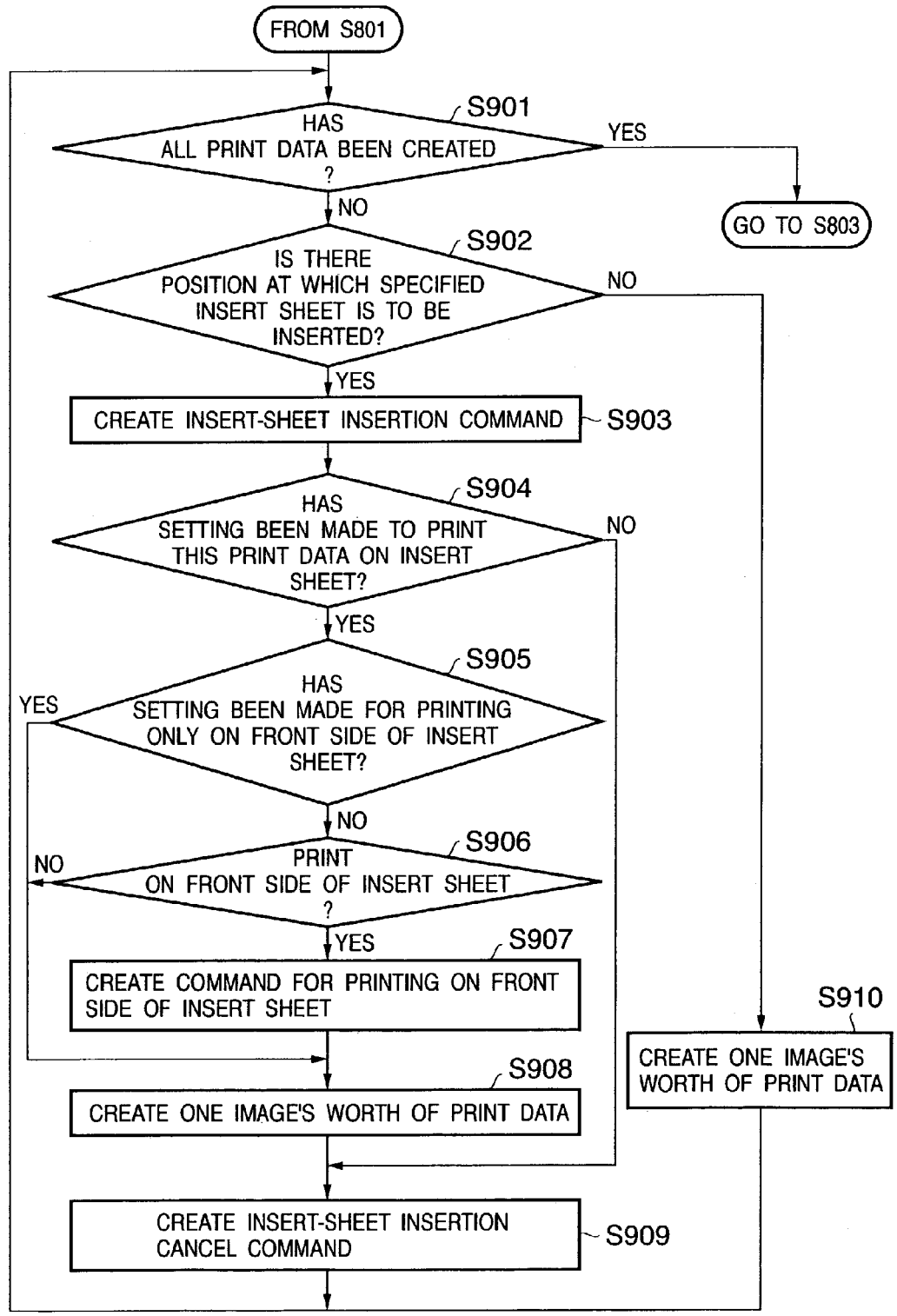
FIG. 9 is a flowchart illustrating the details of processing for generating print data in FIG. 8.

The operation of this embodiment will be described in detail with reference to the flowcharts shown in FIGS. 8, 9 and 11. FIG. 8 is a flowchart of print processing executed by the host computer of this embodiment based upon the printing control program of the present invention, FIG. 9 is a flowchart of the print-data generation processing (step S802) of FIG. 8, and FIG. 11 is a flowchart of print processing executed by the printer.

The print processing according to this embodiment is started by having the user designate a printer as the output destination and command execution of printing by input means such as a keyboard or mouse within an application being run on the host computer. In this case, a print setting by the printer driver may or may not be performed. If the print setting is not made, print processing is executed upon adopting the default settings or earlier made print settings as being valid.

Figure 11:
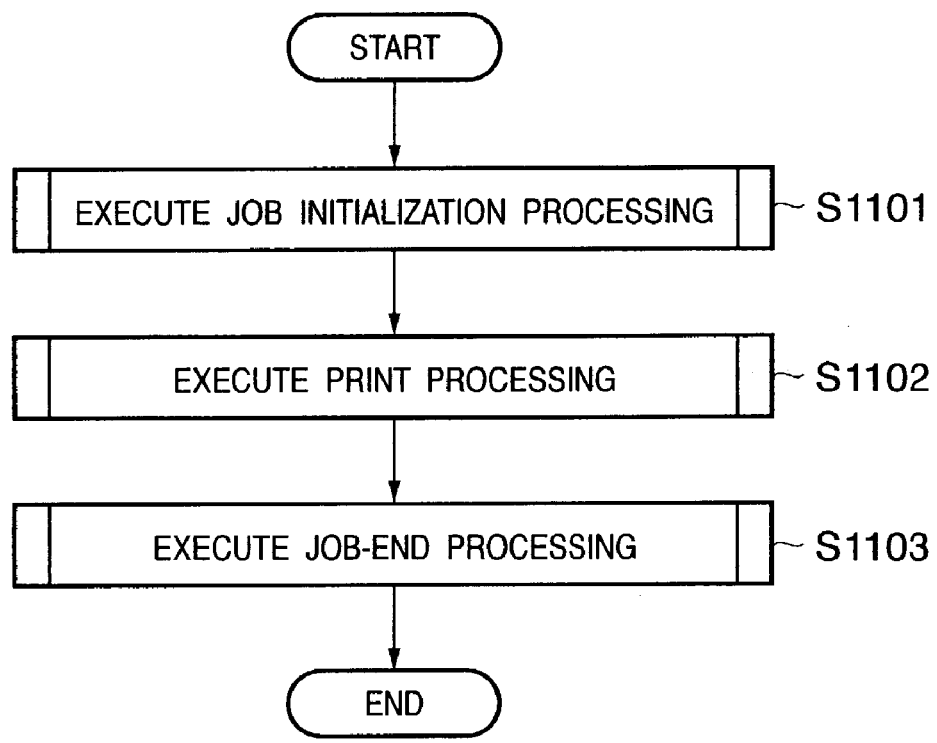
FIG. 11 is a flowchart illustrating print processing by a printer according to the first embodiment.

Further, print processing is broadly classified into generation of print data in the host computer according to the flowchart of FIG. 8 and processing for executing printing by the printer according to the flowchart of FIG. 11. Generation of print data by the host computer will be described first with reference to FIG. 8.

If print execution from within an application is commanded, job initialization processing indicated at step S801 is executed. A series of job initializing command groups of the kind indicated at job initializing command groups 501, 601 shown in FIGS. 5 and 6 are generated based upon print setting information.

Next, print data that will actually be rendered is generated at step S802. Though the details of this processing will be described later, the print data of each logical page is generated and, in dependence upon whether or not an insert sheet is inserted, additional command groups are generated. These additional command groups are transmitted before and after the print data of a page where an insert sheet is to be inserted. Examples of the data generated here are indicated at 502 in FIG. 5 and at 602 to 610 in FIG. 6.

Finally, job-end processing is executed at step S803. Here the host computer generates a series of job-end processing command groups of the kind shown at 503 in FIG. 5 and at 611 in FIG. 6.

Next, the details of print data generation processing (step 802) in FIG. 8 will be described with reference to the flowchart of FIG. 9.

When the job initialization processing of step S801 ends, there is a transition to processing for generating print data. First, the host computer determines whether the creation of all print data has ended (step S901).

Next, the host computer determines whether there is a position (page) at which an insert sheet is to be inserted (step S902). The position for insertion of an insert sheet is specified by an input to the area 403, which is for designating the position where the insert sheet is to be inserted, on the insert-sheet setting screen 400 shown in FIG. 4. In a case where there is no insert-sheet insertion position, and when insertion of an insert sheet has not been set, the host computer generates only print data (step S910).

In a case where there is a position for which insertion of an insert sheet has been set, an insert-sheet insertion command and a paper-feed drawer designating command, which are illustrated as the added command group 603 shown in FIG. 6, are generated in accordance with setting information (step S903). In the example illustrated in FIG. 6, "@PJL SET INSERTING–SHEET=ON" is the insert-sheet insertion command, and "@PJL SET INSERTING–SHEET–DRAWER=1" is the command that specifies the feed port.

Next, the host computer determines whether a print setting regarding the insert sheet has been made (step S904). If a print setting has not been made ("NO" at step S904), then the host computer issues an insert sheet insertion cancel command indicated as the added command 605 in FIG. 6 (step S909). In the example illustrated in FIG. 6, "@PJL SET INSERTING–SHEET=OFF" is the. insert-sheet insertion cancel command.

On the other hand, if a print setting regarding the insert sheet has been made ("YES" at step S904), then the host computer determines whether this is a setting for printing only on the front side of the insert sheet (step S905). If the setting is for printing only on the front side of the insert sheet ("YES" at step S905), then the host computer creates one image's worth of print data of the logical page indicated as 604 in FIG. 6 (step S908).

In this embodiment, the host computer only creates image data printed on this insert sheet; it does not generate a command relating to the layout of the page to be printed. The reason for this is that when insertion of an insert sheet has been carried out, control is executed by the firmware of the printer so as to set the layout to 1UP and perform printing automatically. Accordingly, in a case where such firmware has not been installed, it will suffice if the host computer generates a command that changes the layout to 1UP and a command that restores the layout to 2UP before and after the print data 604 of the inserted page.

If it is found that printing has been set only for the back side of the insert sheet or that there is a setting for printing on both sides of the insert sheet at step S905, then the host computer determines whether the present print data is to be printed on the back side of the insert sheet (step S906). The host computer issues a command (not shown in FIG. 6) for printing on the back side of the insert sheet (step S907) and thenceforth create one image's worth of print data of the logical page in the manner described above (step S908).

When the processing of step S908 ends, the host computer issues the above-mentioned insert-sheet insertion cancel command (step S909). Following the end of steps S909 and S910, control returns to step S901 and the host computer determines whether the creation of all print data has ended.

If it has determined at step S901 that the creation of all print data has ended, then the host computer terminates the processing for generating print data and executes job-end processing (step S803).

The print data generated in the host computer by the above processing is sent to the printer via the interface indicated at 31 in FIG. 1. Of course, the host computer and the printer may be constructed as an integrated whole and the print data may be transmitted by an internal bus rather than by the interface 31. Further, as mentioned above, the type of interface may be a parallel interface (an interface compliant with the Centronics standard in the USA), a USB (Universal Serial Bus) interface, an IEEE 1394, a network such as a LAN or WAN or an interface that will be developed in the future.

Further, all print processing by the host computer corresponding to a command from within an application ends under these conditions and the printing-related program and related data are erased form the RAM 2 by the operating system.

Next, the print processing executed by the printer will be described with reference to the flowchart of FIG. 11.

First, the printer analyzes the print data that has been sent from the host computer and executes the job initializing command group (step S1101). Next, the printer generates a print image in accordance with the print data and executes printing (step S1102). Finally, the printer executes the job-end processing command group (step S1103).

By virtue of the above processing, overall print processing ends and a printed output is produced in accordance with the insert-sheet setting made by the user employing the printer driver.

Thus, in accordance with this embodiment, as described above, a print setting regarding an insert can be made by a simple operation, and it is possible to obtain, by a single print process, an output printed according to settings desired by the user for inserts and for other pages.

<Second Embodiment>

A second embodiment according to the present invention will now be described. The second embodiment also is a printing system having a configuration similar to that of the first embodiment. In the description that follows, components similar to those of the first embodiment are designated by like reference characters and need not be described again. The following description will center on the aspects of this embodiment that differ from the first embodiment.

Figure 12:
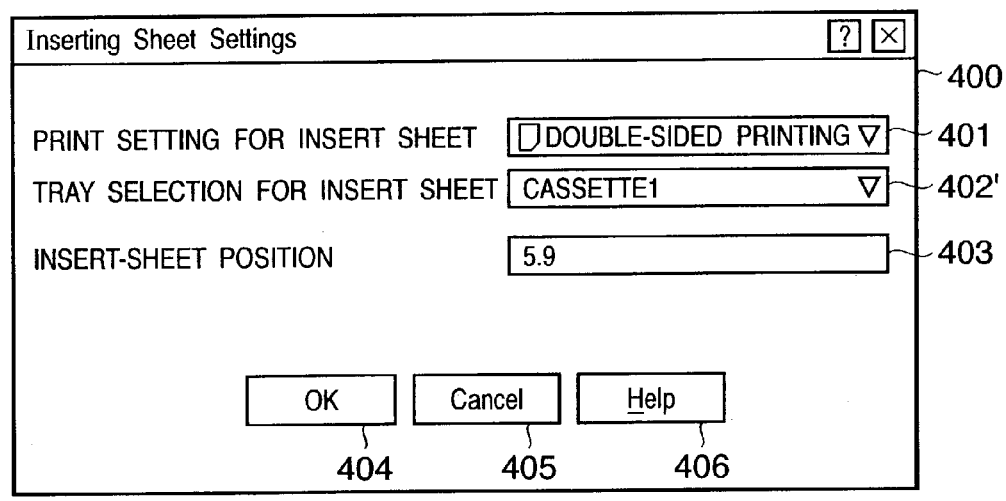
FIG. 12 is a diagram illustrating an example of a setting screen regarding an insert sheet according to a second embodiment of the present invention.

The printer driver according to this embodiment also is so adapted that a print setting regarding an insert sheet can be made separately from a print setting regarding other pages. The screen for setting printing is similar to that of FIG. 10 described in connection with the first embodiment. When a setting is made at 1006 (FIG. 10) to use an insert sheet, the button at 1007 for setting the insert sheet is activated. Clicking on this button causes the display of the insert-sheet setting screen 400, one example of which is illustrated in FIG. 12.

The area 401 is for selecting printing on an insert. For example, front-sided printing, back-sided printing, double-sided printing or no printing can be selected using a pull-down menu. An area 402' is for selecting the tray for the insert paper. For example, by using a pull-down menu, it is possible to select from presently loaded trays and from a sheet feeder (Drawer) for paper feed by manual insertion. The area 403 is for designating the position at which the insert is to be made. For example, pages at which insert sheets are to be inserted are demarcated and specified by commas. According to the settings illustrated in FIG. 12, printing is to be performed on both sides of the inserts, the insert paper is to be supplied from the manual-insertion sheet feeder "Cassette 1", and the inserts are to be inserted as fifth and ninth pages.

Further, the OK button 404 validates the settings and terminates processing; the cancel button 405 invalidates the settings and terminates processing; and the help button 406 is for displaying detailed information relating to setting methods.

Here the display is for a case where setting based upon the feed tray has been selected in the area 1005 for selecting the method of specifying paper feed in FIG. 10. In a case where setting based upon the paper type has been selected, the paper type for the insert would be selected in the area 402'.

Next, print data generated in a case where an insert sheet is inserted according to this embodiment will be described.

Figure 13:
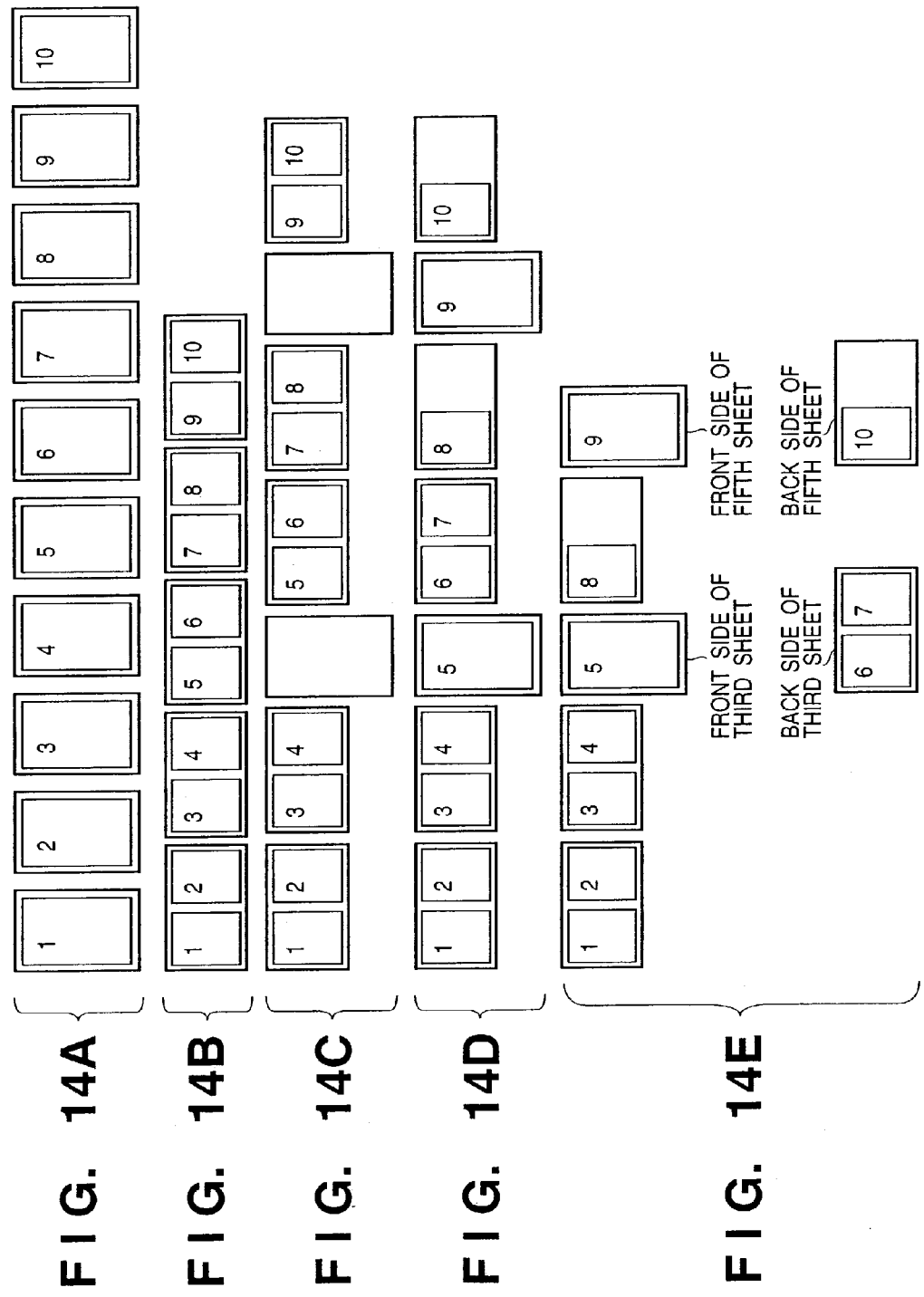
FIG. 13 is a diagram illustrating an example of the content of print data generated when insertion of an insert sheet has been set.

FIG. 13 is a diagram illustrating an example of the content of print data generated when insertion of an insert sheet has been set according to this embodiment. The data shown in FIG. 13 is written in page description language. The data indicated here has been set in such a manner that data of logical page 10 will be printed on both sides in 2UP. In addition, however, fifth and ninth pages have been specified as the page numbers of insert sheets to be inserted.

In conformity with such insertion of insert sheets, a job initialization command group 601a for setting the insertion mode, for specifying the feed path of the inserted paper and for specifying the sides on which the inserted paper will be printed has been added, and command groups for turning insertion processing ON and OFF have been added before and after (at 603' and 605, 607' and 609) print data 604 of the fifth page and print data 608 of the ninth page.

FIGS. 14A to 14H are diagrams illustrating print data, which is generated by the host computer according to this embodiment, and examples of results output by a printer. Though the print data transmitted from the host computer is all the same, the print settings regarding each of the pages and the print settings regarding the inserts differ from each other.

Figure 14:
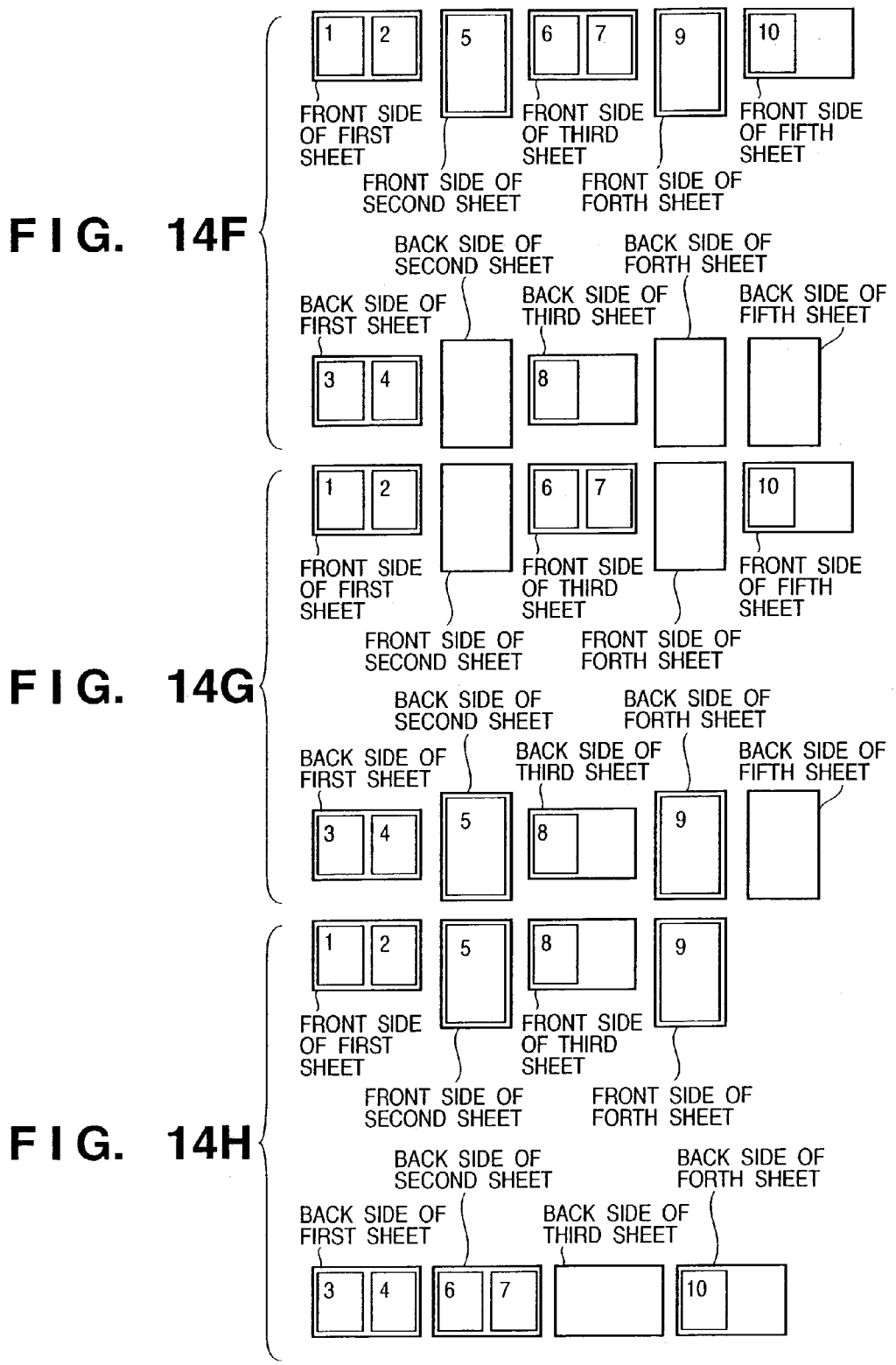
FIGS. 14A to 14H are diagrams illustrating print data from a host computer and examples of results output by a printer with regard to various settings for insert sheets.

FIG. 14A illustrates print data that has been transmitted from the host computer; FIG. 14B illustrates result of printing in a case where there are no inserts and single-sided 2UP has been set for each page; FIG. 14C illustrates result of printing in a case where insert sheets are inserted, printing has not been set for the insert sheets and single-sided 2UP has been set for each page; FIG. 14D illustrates result of printing in a case where insert sheets are inserted, only front-sided printing has been set for the inserts and single-sided 2UP has been set for the other pages; and FIG. 14E illustrates result of printing in a case where insert sheets are inserted, doubled-sided printing has been set for the inserts and single-sided 2UP has been set for the other pages.

The examples illustrated in FIGS. 14F to 14H all illustrate that insert sheets have been inserted. FIG. 14F illustrates result of printing in a case where only front-sided printing has been set for the insert sheets and double-sided 2-UP has been set for the other pages; FIG. 14G illustrates result of printing in a case where only back-sided printing has been set for the insert sheets and double-sided 2-UP has been set for the other pages; and FIG. 14H illustrates result of printing in a case where double-sided printing has been set for the insert sheets and double-sided 2-UP has been set for the other pages. It should be noted that the result of printing shown in FIG. 14H corresponds to the print data of FIG. 13.

As will be understood from FIGS. 14A to 14H, this embodiment is such that if single-sided or double-sided printing has been set for an insert, then the printing layout is set to 1UP in either case; if double-sided printing has been set for an insert, then the printing layout of the front side is set to 1UP and the printing layout of the back side is set to be the same as that of the other pages (2UP in the illustrated example).

Figure 15:
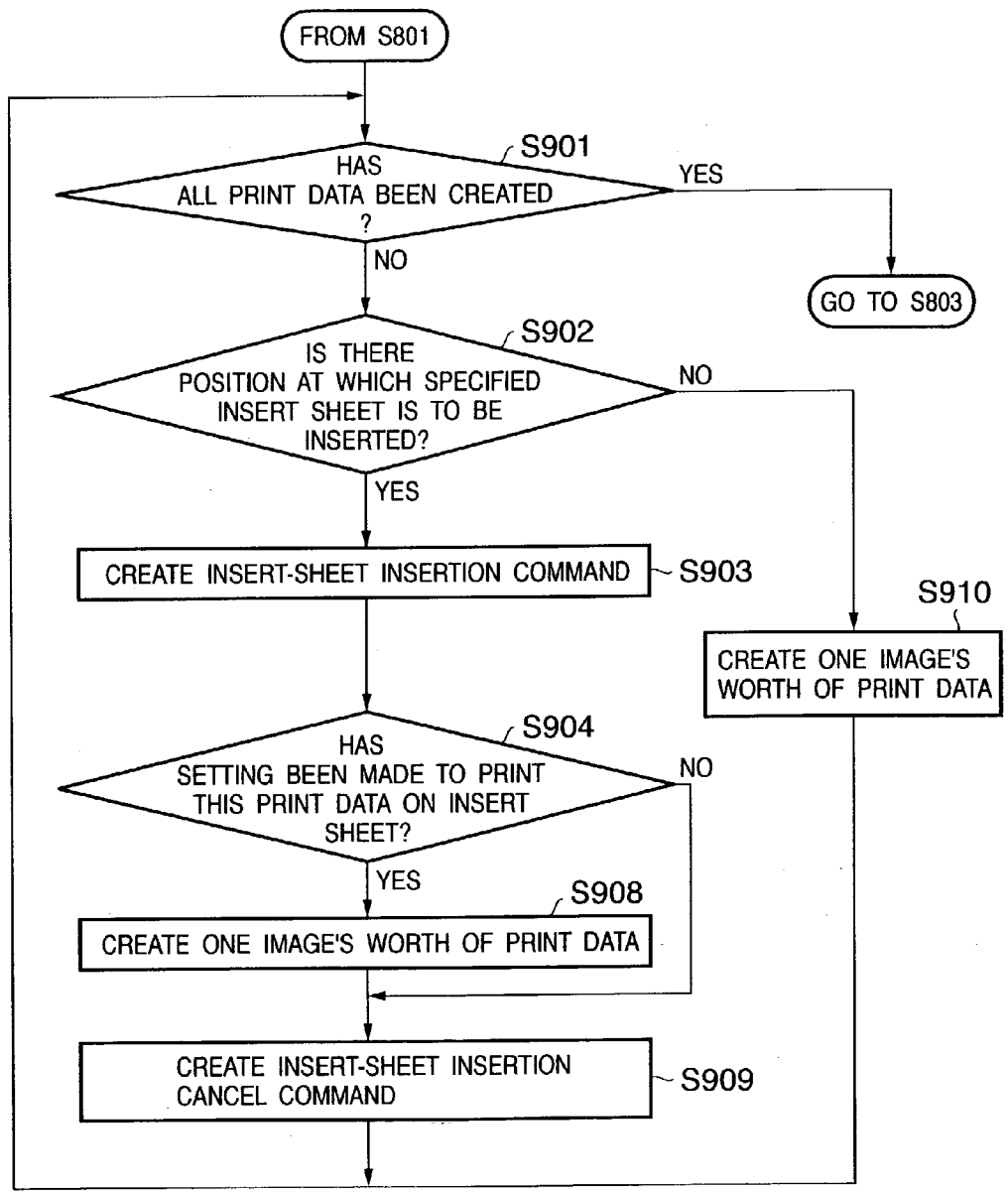
FIG. 15 is a flowchart illustrating the details of processing for generating print according to the second embodiment.

The operation of this embodiment will now be described in detail. Print processing executed by the host computer in this embodiment based upon the printing control program of the present invention is similar to that of the flowchart of FIG. 8 described in the first embodiment. FIG. 15 is a flowchart illustrating the print data generation processing (step 802) of FIG. 8. The flowchart of print processing executed by the printer is similar to that of FIG. 11 described in the first embodiment.

The print processing according to this embodiment is started by having the user designate a printer as the output destination and command execution of printing by input means such as a keyboard or mouse within an application being run on the host computer. In this case, a print setting by the printer driver may or may not be made. If the print setting is not made, print processing is executed upon adopting the default settings or earlier made print settings as being valid.

Further, print processing is broadly classified into generation of print data in the host computer according to the flowchart of FIG. 8 and processing for executing printing by the printer according to the flowchart of FIG. 11. Generation of print data by the host computer will be described first with reference to FIG. 8.

If print execution from within an application is commanded, job initialization processing indicated at step S801 is executed. Based upon print setting information, the host computer determines whether insertion of paper has been set. If insertion has not been set, the host computer generates a series of job initializing command groups of the kind indicated at job initializing command group 601 shown in FIG. 6. If insertion has been set, then the host computer generates the additional initializing command group 601a besides the job initializing command group 601.

The commands added in the insertion processing at 601a will be described. Specifically, "@PJL SET INSERTING-MODE=ON" declares that the setting is one which performs insertion of an insert sheet in this print job. This is followed by "@PJL SET INSERTING SHEET-DRAWER=1", which is a command that specifies the insert-sheet feed port. The final "@PJL SET INSERTING-SHEET-PRINT-MODE=BOTHSIDE" is a command indicating that double-sided printing has been specified as the printing-side designation regarding the insert.

Next, at step S802, the host computer generates print data that will actually be rendered. Though the details of this processing will be described later, the print data of each logical page is generated and, in dependence upon whether or not an insertion is made, the host computer generates initializing command groups that are to be added on or additional command groups that will be transmitted before and after a page to be inserted. Examples of the data generated here are indicated at 602 in FIG. 13 and at 602 to 610 in FIG. 13.

Finally, job-end processing is executed at step S803. Here the host computer generates a series of job-end command groups of the kind shown at 611 in FIG. 13.

Next, the details of print data generation processing (step 802) in FIG. 8 will be described with reference to the flowchart of FIG. 15.

When the job initialization processing of step S801 ends, there is a transition to processing for generating print data. First, the host computer determines whether the creation of all print data has ended (step S901).

Next, the host computer determines whether there is a position (page) at which an insert sheet is to be inserted (step S902). As described earlier, the determination regarding the position for insertion of an insert sheet is made in accordance with data stored upon being set on the insert-sheet setting screen 400 shown in FIG. 12. In a case where there is no insert-sheet insertion position, and when insertion of an insert sheet has not been set, the host computer generates only print data (step S910).

In a case where there is a position for which insertion of an insert sheet has been set, first the host computer generates an insert-sheet insertion command illustrated as the additional command group 603' shown in FIG. 13 (step S903). In the example illustrated in FIG. 13, "@PJL SET INSERTING–SHEET=ON" is the insert-sheet insertion command.

Next, the host computer determines whether a print setting regarding the insert sheet has been made (step S904). If a print setting has not been made ("NO" at step S904), then the host computer issues an insert-sheet insertion cancel command indicated as the additional command 605 in FIG. 13 (step S909). In the example illustrated in FIG. 13, "@PJL SET INSERTING–SHEET=OFF" is the insert-sheet insertion cancel command.

On the other hand, if a print setting regarding the insert sheet has been made ("YES" at step S904), then the host computer creates one image's worth of print data of the logical page indicated as 604 in FIG. 13 (step S908). The host computer then issues the insert-sheet insertion cancel command.

In this embodiment, the host computer only creates image data printed on this insert sheet; it does not generate a command relating to the layout of the page to be printed. The reason for this is that when insertion of an insert sheet has been carried out, control is executed by the firmware of the printer so as to set the layout to 1UP and perform printing automatically solely with regard to the side printed on initially. Accordingly, in a case where such firmware has not been installed, it will suffice if the host computer generates a command that changes the layout to 1UP and a command that restores the layout to 2UP before and after the print data 604 of the inserted page.

When step S909 or S910 ends, control returns to step S901 and the host computer determines whether the creation of all print data has ended.

If it has determined at step S901 that the creation of all print data has ended, then the host computer terminates the processing for generating print data and executes job-end processing (step S803).

The print data generated in the host computer by the above processing is sent to the printer via the interface indicated at 31 in FIG. 1. Of course, the host computer and the printer may be constructed as an integrated whole and the print data may be transmitted by an internal bus rather than by the interface 31. Further, as mentioned above, the type of interface may be a parallel interface (an interface compliant with the Centronics standard in the USA), a USB (Universal Serial Bus) interface, an IEEE 1394, a network such as a LAN or WAN or an interface that will be developed in the future.

Further, all print processing by the host computer corresponding to a command from within an application ends under these conditions and the printing-related program and related data are erased form the RAM 2 by the operating system.

The print processing executed by the printer is similar to that of the first embodiment and need not be described again.

Thus, in accordance with this embodiment, as described above, if only single-sided or double-sided printing of an insert is performed, the insert is printed in the 1UP layout to facilitate recognition of the insert and provide the effect of a topic heading with regard to the pages that follow the insert. When both sides of the insert are printed on, the front side is printed in the 1UP layout to provide the effect of a topic heading and the back side is printed in the 2UP layout, which is identical with that of other pages, thereby making it possible to reduce the total number of pages printed.

(Other Embodiments)

In the above embodiments, the host computer creates print data that includes one image in association with each logical page and transmits this print data along with layout (N-UP) information to the printer. Upon receiving this data and information, the printer analyzes the layout (N-UP) information and assigns the layout (N-UP) that has been set by the user, namely the number of images specified for one page. However, it is possible to adopt an arrangement in which the host computer creates print data in page units identical with those of the results of printout, where the print data reflects the layout (N-UP) set by the user and the setting information regarding inserts. The printer in this arrangement performs printing page by page in accordance with the print data that has been transmitted to it.

Thus, the host computer generates print data of each page of an insert in the layout that has been set for the inserts, generates print data of each page other than the insert pages in the layout that has been set for these other pages, and transmits this data to the printer.

For example, assume that only front-sided 1UP has been set for inserts and only front-sided 2-UP has been set for the other pages. In such case the data of one logical page (image) will be included in the print data for each insert, and the data of two logical pages (images) will be included in the print data for each of the other pages. If this arrangement is adopted, the present invention can be applied even to a printer that does not have a layout function.

The present invention may be applied to a system constituted by a plurality of devices or to an apparatus comprising a single device.

Furthermore, there are cases where the object of the invention is attained also by supplying a software program (a program corresponding to the flowcharts shown in FIGS. 8, 9, 11 and 15 of the foregoing embodiments), which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program.

Accordingly, since the functions of the present invention are implemented by computer, the program codes per se installed in the computer also implement the present invention. In other words, the claims of the present invention also cover a computer program that is for the purpose of implementing the functions of the present invention.

In this case, so long as the system or apparatus has the functions of the program, the form of the program, e.g., object code, a program executed by an interpreter or print data supplied to an operating system, etc., does not matter.

Examples of storage media that can be used for supplying the program are a floppy disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A printing control method in an information processing apparatus for controlling a printing apparatus that is capable of executing insert print processing for inserting a second printing medium as an insert sheet into a first printing medium, said method comprising the following steps executed in said information processing apparatus:

a print-setting step of setting second print property for the second printing medium setting that differs from a first print property for the first printing medium in a case where an instruction for applying print processing to the second printing medium is input; and a print-data generating step of generating print data in which the second printing medium is printed on according to the second print property set by said print-setting step and the first printing medium is printed on according to the first property, wherein, if print processing is applied to both sides of the second printing medium, said print-data generating step generates data in which printing is performed on the front side of the second printing medium according to a printing layout of the second print property and on the back side of the second printing medium according to a printing layout the same as that of the first print property.

2. The method according to claim 1, wherein said print-data generating step generates print data by adding information concerning print settings for the first and second printing media to each page as necessary.

3. The method according to claim 1, wherein said print-data generating step generates data of the first printing medium upon arranging each page according to the printing layout of first print property, and generates data of the second printing medium upon arranging each page according to the printing layout of the second print property.

4. The method according to claim 1, wherein the print layout of the second print property lays out data of one page for a single sheet of a printing medium.

5. An information processing apparatus for controlling a printing apparatus that is capable of executing insert print processing for inserting a second printing medium as an insert sheet into a first printing medium said information apparatus comprising:

print-setting assignment means for setting second print property for the second printing medium that differs from a first print property for the first printing medium in a case where an instruction for applying print processing to the second printing medium is input; and print-data generating means for generating print data in which the second printing medium is printed on according to the second print property set assigned by said print-setting assignment means and the first printing medium is printed on according to the first print property, wherein, if print processing is applied to both sides of the second printing medium, said print-data generating means generates data in which printing is performed on the front side of the second printing medium according to a printing layout of the second print property and on the back side of the second printing medium according to a printing layout the same as that of the first print property.

6. The apparatus according to claim 5, wherein said print-data generating means generates print data by adding information concerning print settings for the first and second printing media to each page as necessary.

7. The apparatus according to claim 5, wherein said print-data generating means generates data of the first printing medium upon arranging each page according to the printing layout of first print property, and generates data of the second printing medium upon arranging each page according to the printing layout of the second print property.

8. A computer-readable medium storing a computer program for controlling a printing apparatus that is capable of executing insert print processing for inserting a second printing medium as an insert sheet into a first printing medium and printing a plurality of sheets, said program comprising:

a print-setting assignment step of assigning the second printing medium a second print property that differs from a first print property for the first printing medium in a case where a designation has been made so as to execute the insert print processing for applying print processing to the second printing medium; and a print-data generating step of generating print data in which the second printing medium is printed on according to the second print property assigned by said print-setting assignment step and the first printing medium is printed on according to the first print property, wherein, if print processing is applied to both sides of the second printing medium, said print-data generating step generates data in which printing is performed on the front side of the second printing medium according to a printing layout of the second print property and on the back side of the second printing medium according to a printing layout the as that of the first print property.

* * * * *